United States Patent [19]

Tellerman

[11] 3,898,555

[45] Aug. 5, 1975

[54] LINEAR DISTANCE MEASURING DEVICE USING A MOVEABLE MAGNET INTERACTING WITH A SONIC WAVEGUIDE

[75] Inventor: Jacob Tellerman, Bayside, N.Y.

[73] Assignee: Tempo Instrument Inc., Plainview, N.Y.

[22] Filed: Dec. 19, 1973

[21] Appl. No.: 426,075

[52] U.S. Cl. ............................ 324/34 D; 333/30 M
[51] Int. Cl.² ........................................ G01R 33/00
[58] Field of Search ............ 324/34 R, 34 D, 34 PS, 324/34 MA, 34 L, 34 ST, 18 C, 189; 333/30 M

[56] References Cited
UNITED STATES PATENTS 2,401,094  5/1946  Nicholson, Jr. .............. 324/34 MA
3,011,136  11/1961  Scarrott ........................ 333/30 M
3,413,544  11/1968  Jotten et al. ...................... 324/189

FOREIGN PATENTS OR APPLICATIONS 827,258  2/1960  United Kingdom ............. 333/30 M
896,714  5/1962  United Kingdom ............. 333/30 M Primary Examiner—Robert J. Corcoran
Attorney, Agent, or Firm—Bauer & Amer

[57] ABSTRACT

A linear distance measuring device is disclosed in which the time it takes a torsion pulse to traverse a sonic waveguide from a movable magnet to a pulse responsive element is determined and converted to a measurement of the distance from the movable magnet to the pulse responsive element. The position of the magnet, which is moved by an external means such as a machine tool element, can thus be determined precisely.

11 Claims, 6 Drawing Figures

PATENTED AUG 5 1975
3,898,555
SHEET 1
FIG.1
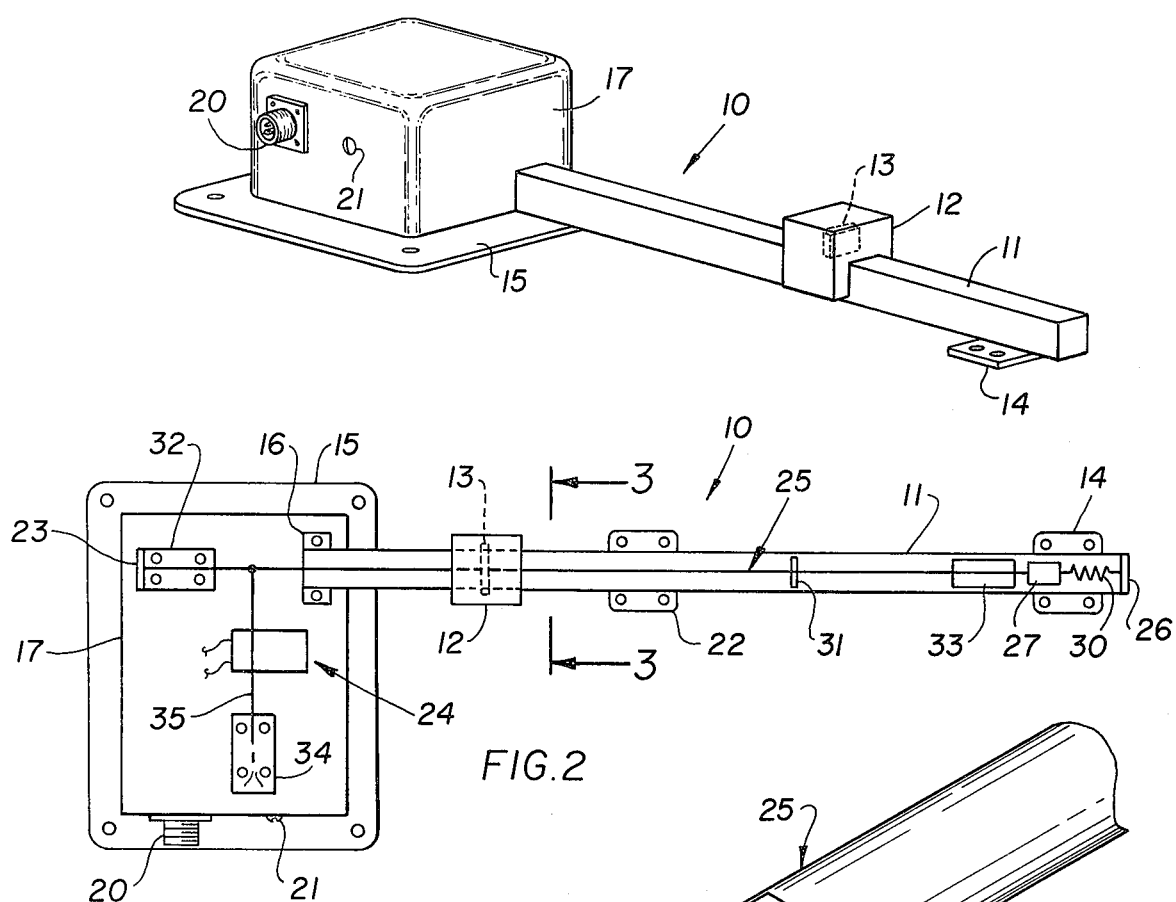
FIG.2
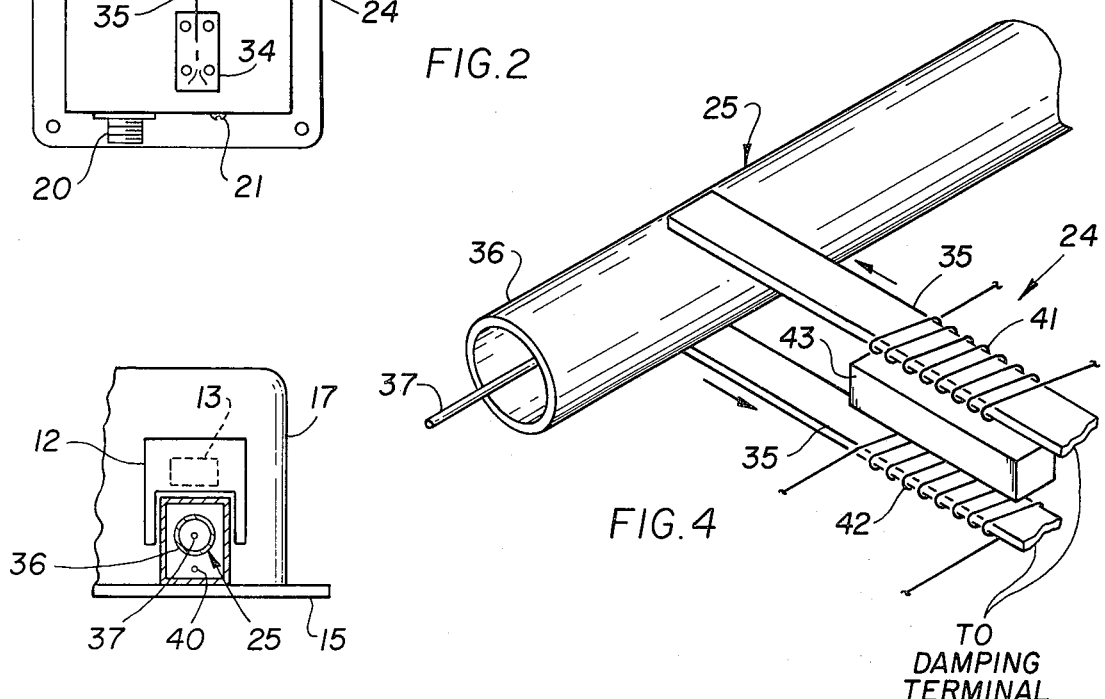
FIG.3
FIG.4
TO DAMPING TERMINAL A. PULSES FROM PULSE GENERATOR
B. PULSES GENERATED BY MODE TRANSFORMER
C. PULSE TRAIN FROM SWITCH — D.C. REFERENCE VOLTAGE
D. AVERAGE D.C. OUTPUT AVAILABLE TO UTILIZATION DEVICE

LINEAR DISTANCE MEASURING DEVICE USING A MOVEABLE MAGNET INTERACTING WITH A SONIC WAVEGUIDE

BACKGROUND OF THE INVENTION

This invention relates to sonic delay lines, and more particularly to such a delay line used in a precision measuring device.

It has long been known that sonic pulses transmitted along a waveguide generate, in the presence of a magnetic field, a voltage in a ferromagnetic conductor. Conversely, if the conductor is conducting an electrical pulse, it will experience a twisting effect when the pulse interacts with a magnetic field. This phenomenon is generally referred to as the Wiedemann Effect. The sonic pulses may be either longitudinal or torsional depending on the transducer element used to generate the pulse. While magnetostrictive transducers for longitudinal pulsing are simpler to construct, the propagation characteristics of a torsional pulse are superior to those of a longitudinal pulse, and, consequently, torsional delay lines are preferred for practical applications. This preference for delay lines operating in a torsional mode is fostered also by the ready availability of so-called mode converters which enable longitudinal pulse transducers to generate torsional pulses.

The present invention is particularly concerned with a precision measuring gage in which the location or position of a movable magnet along a sonic delay line is precisely determined. Heretofore, so far as applicant is aware, measuring devices based on the Wiedemann Effect have resorted to the provision of a mode converter that launched a sonic pulse at one end of a waveguide and the variably positioned magnet, the location or position of which is to be determined, generated an electrical pulse. More specifically, the interaction of the sonic pulse propagated down the waveguide and the magnetic field associated with the magnet generated a voltage pulse in the ferromagnetic waveguide. The time interval between the launching of the sonic pulse and the generation of the voltage pulse is a measure of the distance between the pulse launching mode converter and the position of the variably positioned magnet since the sonic pulse is propagated at a fixed rate that depends on the shear modulus and density of the waveguide. See, for example, U.S. Pat. No. 2,995,736.

SUMMARY OF THE INVENTION

While the device of the just mentioned patent performs satisfactorily, it is not without significant drawbacks. Not the least of these is that the waveguide itself acts as a large antenna which picks up extraneous or spurious noise. Considering the low level of the signal generated by the Wiedemann Effect, any extraneous noise reduces the signal to noise ratio to a value which increases the demands placed on the electronic detection circuitry.

It is, therefore, an object of the present invention to provide an improved measuring gage.

It is another object of the present invention to provide a measuring gage in which a sonic pulse is launched by a variably positioned magnet.

Yet another object of the invention is to provide an improved measuring gage in which the effects of spurious signal pick-up by the waveguide are minimized.

Still other objects of the invention will become clear as the description of a preferred embodiment of the invention proceeds.

In carrying out the invention, there is provided a ferromagnetic waveguide having a mode converter placed at one end thereof. A permanent magnet, the position of which is to be determined, is mounted for movement along the waveguide. Circuitry is also provided for applying a voltage to launch a current pulse along the waveguide, the arrangement being such that as the magnetic field associated with the pulse interacts with the magnetic field associated with the permanent magnet, a sonic torsional pulse is launched for transmission along the waveguide. The sonic pulse arrives at the mode converter at a time depending on its propagation rate along the waveguide, and the time interval between launching of the current pulse and the reception of the sonic pulse at the mode converter is a measure of the location or position of the permanent magnet relative to the mode converter. It will be appreciated that the location where the sonic pulse is converted to an electrical signal for utilization in an electronic read-out circuit is at the fixedly placed mode converter, thus enabling the signal generating elements to be adequately shielded to improve the signal to noise ratio of the system. Also, in the preferred embodiment of the invention, the current pulse carrying conductor is a wire coaxially threaded through a hollow tube which serves as the waveguide for the sonic pulse. In this case, shielding is even more effective since the mode converter is electrically isolated from the pulse conductor.

Features and advantages of the invention may be gained from the foregoing and from the following description of a preferred embodiment of the invention.

In the drawing:

FIG. 1 is a perspective view of the precision measuring gage of the present invention;

FIG. 2 is a schematic top plan view of the measuring gage;

FIG. 3 is a cross sectional view taken along line 3 — 3 of FIG. 2;

FIG. 4 is a schematic perspective view of a mode converter suitable for embodiment in the present invention;

Figures 5, 6:
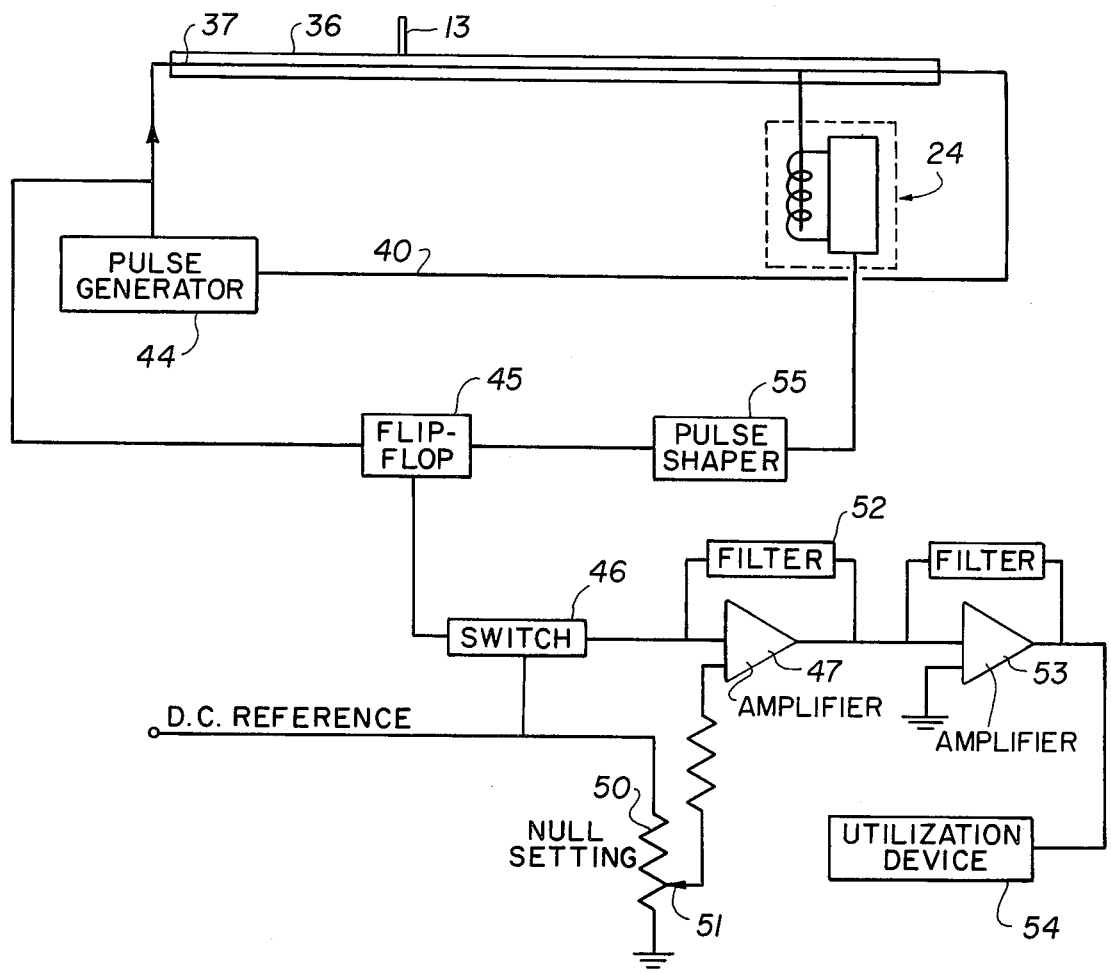
FIG. 5 is a schematic circuit diagram of the circuitry used in the present invention.
FIG. 6 is a pulse diagram illustrating the various pulses produced by the apparatus described to embody the invention.

Referring now to the drawing, the precision measuring gage of the present invention is shown in FIG. 1. In the embodiment illustrated and to be described, a linear displacement measuring device 10 is contemplated. Thus there is shown an elongated beam 11 along which moves a non-magnetic plastic block 12 having a permanent magnet 13 molded therein. The block may be supported for sliding engagement with beam 11 or it may move in close proximity to the beam while not contacting it. In either case, block 12 will be connected to the element the displacement of which is to be measured. As the element (not shown, but which may be for example a machine tool component) moves, block 12 will be displaced a corresponding distance.

One end of beam 11 is provided with a mounting flange 14 while the other end is secured to the support plate 15 by means of another flange 16. Both flange 14 and plate 15 are provided with mounting holes which enable the entire device 10 to be fastened to a stable support, which may be a stationary part of a machine tool. The housing 17 is provided with an external electrical connector 20 by which the internal electronic components provided within housing 17 are connected to a power source and a read-out device. The latter forms no part of the present invention except in its most generic sense. A null adjusting screw 21 is also provided on housing 17 and it enables the circuitry within to be adjusted for the home or reference position of magnet block 12.

Turning now to FIG. 2, the physical aspects of measuring device 10 will be described. The box-like beam 11 is illustrated with terminal mounting flange 14 and support plate flange 16 at its ends; additional intermediate flanges 22 may be provided when deemed necessary to rigidize an especially long beam 11. On support plate 15 there is provided a bracket 23 and a mode converter 24. Mounted within beam 11 is a sonic waveguide 25 supported at one end by bracket 23 and at its other end by end wall 26 of beam 11. This latter connection is made through the intermediary of a link 27 and a tension spring 30. Means may be provided to adjust the tautness of waveguide 25 by varying the tension of spring 30.

It is to be noted that beam 11 is formed of a non-magnetic material so as not to effect the magnetic field associated with magnet 13 in block 12 or that generated in waveguide 25 by a voltage pulse travelling in the waveguide. Moreover, while a box-like beam has been illustrated, it could also be of a circular cross section in which case the permanent magnet block could be in the form of an annulus that rotates about the beam as it is longitudinally displaced therealong.

Waveguide supports 31 may be provided along the waveguide if the length of the device 10 warrants. These need not be further described inasmuch as various types of such supports are known in the art and their use is conventional. Also, in order to minimize reflections of the sonic pulses from the terminals of waveguide 25, damping elements 32 and 33 are provided. The damping elements usually comprise rubber pads clamped about the waveguide and these effectively absorb the sonic pulses generated in the waveguide and minimize, if not totally eliminate, reflections of the generated pulses. Damping element 33 may be a floating element which is fitted snugly within beam 11 so as not to change its relative position within the beam. Here again, however, such damping elements are generally known and further elaboration is not required. A third damping element 34 is provided for the free ends of the tapes 35 of mode converter 24.

Before proceeding to a description of mode converter 24, attention is directed to FIG. 3 in which the sonic pulse waveguide 25 is illustrated as a thin walled tubular member 36 through which is threaded a wire 37 which carries an electrical pulse. These pulses will be further explained when the electronic circuitry is hereinafter described. Although a single element could be the conductor for both types of pulses, the arrangement of a separate conductor for the electrical and the sonic pulses is preferred. The reason for this is that in a solid ferromagnetic wire carrying both the current and the sonic pulses, the current pulses travel or flow on the outer-most part of the wire because of "skin" effects and thorough magnetic induction is not achieved. With a wire conductor inside a ferromagnetic tube, a more thorough magnetic induction in the tube is provided and a higher induced stress pulse is achieved. Also, narrower pulses can be induced, which is the same as achieving a higher frequency response and improved positioning performance. Furthermore, in a solid ferromagnetic wire, residual magnetic flux induced by magnet 13 tends to remain in the solid waveguide and cause effects of erroneous position indication when magnet 13 is moved from one direction compared to the other direction. This residual magnetic field is more thoroughly reduced by the action of a wire conductor in a ferromagnetic tube where the current pulses cause more thorough magnetization in the circular direction. This appears to reduce the residual longitudinal effects of magnet 13 extensively.

It is to be noted that FIG. 3 is not to be interpreted as a scale rendering of the sizes and relationship of tubular member 36 and wire 37. The return wire 40 for the electrical pulse circuit is also enclosed in beam 11.

The mode converter 24, shown schematically in FIG. 4, according to the present invention, converts a torsional sonic pulse travelling along waveguide 25 to a longitudinal stress pulse in transducer tapes 35. The pulsing of tapes 35, in turn, generates an electrical signal which is then utilized in the electronic circuitry of the system to determine the position of magnet block 12. Two tapes are used to obtain an enhanced electrical signal although one tape could be used if a weaker signal would suffice. It might be well to mention at this point the advantages of resorting to a torsional sonic pulse rather than a longitudinal one. Torsional pulses are induced by the interaction of a current in the waveguide and a longitudinal magnetic field, whereas to generate a strong longitudinal pulse a coil around the waveguide would be required; and that is not as practical as providing a magnet in a movable block as in the present invention. Moreover, torsional pulses can travel long distances over elongated waveguides with very little distortion or wave dispersion. Nor are they as easily disturbed by externally induced shocks or vibrations.

The propagation velocity, as noted hereinabove, is determined by the modulus of elasticity of the waveguide, and with certain materials, such as nickel-iron alloys, the modulus can be made independent of temperature. Thus, the measuring gage herein described is temperature stable over a wide temperature range.

The tapes 35 are formed of a material that provides magnetic induction changes due to mechanical strains. Such materials, for example, include pure nickel, nickel-iron alloys, and cobalt-iron alloys. Tapes 35 are welded to diametrically opposite points on waveguide 25. The tapes operate in a push-pull manner when the torsion pulse travelling along waveguide 25 reaches the joint between tapes 35 and waveguide 25. That is, one tape experiences a pulsed expansion while the other tape undergoes a pulsed contraction. The pulsed contractions and expansions of tapes 35 (which occur at sonic velocities) cause a change in the magnetic induction in coils 41 and 42 which intimately surround the tapes. A permanent magnet provides the initial magnetic bias for the coils. The change in magnetic induction induces voltages in the coils to provide an electrical signal. The coils are interconnected to add the signals generated in each one to thereby provide a suitable signal indicating the arrival of a torsion pulse at the point where the tapes are joined to the waveguide. A bias magnet 43 is also provided in the mode converter assembly. The tapes 35, after passing through transducer coils 41 and 42 terminate in damping element 34. This damping element serves the same general purpose as elements 32 and 33, and is similar in construction, especially to element 32.

The system thus far described is preferably utilized as follows. An electrical pulse is generated and transmitted over a circuit comprising wires 37 and 40. The resultant magnetic field associated with current flow in wire 37 is a circular field and it is concentrated in waveguide element 36. The magnetic field associated with permanent magnet 13 distorts the circular field associated with wire 37 to a helical field and at the same time launches a sonic torsional pulse. The torsional pulse will travel along waveguide element 36 at a predetermined velocity and when it reaches tapes 35 a signal will be generated in coils 41 and 42. The time interval between the initial electrical pulse and the signal pulse generated in coils 41 and 42 is a measure of the distance of magnet 13 from a reference or home position. Either a digital or an analogue technique can be utilized to give an indication of the location of magnet 13. In a digital approach, a high frequency precision clock will generate a train of pulses that will be counted for the interval between the initial electrical pulse on wire 37 and the pulse generated in coils 41 and 42. Knowing the rate at which a sonic pulse travels along waveguide element 36 enables one to correlate the number of counted pulses from the clock to the distance it is desired to measure. Rather than describe a digital system of the type mentioned, a preferred analogue system will be described. Attention, therefore, is directed to FIG. 5 which schematically illustrates just such a system.

A pulse generator 44 generates a train of pulses to be fed to wire 37. Each pulse is also fed to bistable flip-flop 45 to set the flip-flop. Setting of the flip-flop closes switch 46 thus permitting a D.C. reference voltage to be applied to the input terminal of an operational amplifier 47. A null adjusting potentiometer 50 provides a bias voltage to the other input terminal of amplifier 47 to obtain a voltage subtraction. The movable contact 51 of potentiometer 50 is positioned by adjusting screw 21. The output of amplifier 47 is filtered by filter 52 and fed to the input of an amplifier 53. The output of amplifier 53 is further filtered before being fed to a utilization device 54.

The electrical pulse to wire 37 results in the launching of a sonic torsional pulse near magnet 13, and when the torsional pulse reaches tapes 35 of mode converter 24, an electrical pulse is generated in coils 41 and 42. This pulse is transmitted to a pulse shaper 55 and thence to the reset terminal of flip-flop 45. Resetting of the flip-flop opens switch 46 to disconnect the D.C. reference voltage source from amplifier 47. The operation of the circuit is represented quite clearly in the pulse diagram of FIG. 6. Row A represents the train of pulses generated by pulse generator 44. Row B represents the pulses generated by the mode converter 24 on reception of the torsional pulse launched by variably positioned magnet 13. The time interval $T_d$ between a pulse in Row A and one in Row B is the time required for a torsional pulse to travel from magnet 13 to mode converter 24 and hence the distance from the magnet to the mode converter. Row C represents the modulated voltage pulse train fed from the D.C. voltage reference source through switch 46 to amplifier 47, the width of the modulated pulse now representing the distance from magnet 13 to mode converter 24. Row D represents the averaged D.C. output of the pulse train shown in Row C and the output of amplifier 53. Thus the average D.C. voltage represents the distance desired to be measured; the greater the voltage, the greater the distance.

In operation, magnet 13 will be positioned at its zero or reference position near housing 17, or more correctly near mode converter 24. Screw 21 will be adjusted to bias amplifier 47 so that a zero output is obtained from amplifier 53. Thereafter, as magnet 13 is moved away from its reference position the D.C. voltage output from amplifier 53 is a direct measure of the distance magnet 13 is away from its zero or reference position. Utilization device 54 will simply be a voltage responsive device calibrated to convert the voltage to a distance measurement.

Having thus described the invention, it should be clear that many changes could be made to the described embodiment without departing from the spirit and scope of the invention. For example, a single rod or wire could be used for transmitting the electrical pulse from generator 44 and the sonic pulse launched by magnet 13, or a digital read-out system could be provided instead of the analogue system described. Also, instead of the mode converter described, a second fixedly located magnet could be positioned at the same location as the mode converter which second magnet would generate a voltage pulse in wire 37 when the torsional pulse passed beneath it. This pulse generated by the second magnet would reset flip-flop 45. Instead of a straight waveguide as illustrated, a circular waveguide could be provided and degrees of rotation of a rotating magnet could be measured. Also, a piezoelectric torsional sonic pulse to voltage converter could be used. Therefore, it is to be understood that the foregoing description and the drawing are to be interpreted in an illustrative sense rather than as limiting the scope of the invention.

What is claimed is:

1. A linear distance measuring device comprising, sonic waveguide means formed of a tubular member of magnetostrictive material, electrical conducting means located within said waveguide means, said conducting means having an outside diameter less than the inside diameter of said waveguide means and being in unattached relationship with said waveguide means, pulse generating means for applying electrical pulses to said electrical conducting means, magnet means movable along said waveguide means, mode converter means located in a fixed position along said waveguide means for generating an electrical signal in response to the reception of a sonic torsion pulse launched by said magnet means when an electrical pulse is applied to said electrical conducting means, circuit responsive means for measuring the time interval between the application of an electrical pulse to said electrical conducting means and the reception of a sonic pulse by said signal generating means, and means responsive to said circuit means for indicating the position of said movable magnet means relative to said electrical signal generating means.

2. A linear distance measuring device comprising an electrical conducting element, an associated sonic pulse conducting member of a magnetostrictive material, said electrical conducting element and said sonic pulse conducting member being substantially parallel to one another and physically separated so that a sonic pulse transmitted by said sonic pulse conducting member is not attenuated by said electrical conducting element, magnet means movable along said sonic pulse conducting member, pulse generating means for applying electrical pulses to said electrical conducting element to produce a pulsing magnetic field in said sonic pulse conducting member, means located along said sonic pulse conducting member for generating an electrical signal in response to the reception of a sonic pulse launched by said magnet means when an electrical pulse is applied to said electrical conducting element, circuit means responsive to a pulse from said pulse generating means and to a signal from said signal generating means, and means responsive to said circuit means for indicating the position of said movable magnet means relative to said electrical signal generating means.

3. A linear distance measuring device comprising, an electrical conductor, sonic waveguide means comprising a tubular magnetostrictive member concentric with said electrical conductor, said tubular member having an inside diameter greater than the outside diameter of said electrical conductor, said electrical conductor being in unattached relationship with said tubular member, permanent magnet means movable along said waveguide means, pulse generating means for applying electrical pulses to said electrical conductor to produce a circular magnetic field in said waveguide means, mode converter means connected to said waveguide means for generating an electrical signal in response to the reception of a sonic torsion pulse launched by said permanent magnet means when an electrical pulse is applied to said electrical conductor, circuit means responsive to a pulse from said pulse generating means and to a signal from said signal generating means, and means responsive to said circuit means for indicating the position of said movable magnet means relative to said electrical signal generating means.

4. A linear distance measuring device comprising, sonic waveguide means formed of a tubular member, an electrical conducting element provided within said tubular member in parallel spaced relationship thereto and in unattached relationship with said tubular member, magnet means movable along said waveguide means, pulse generating means for applying electrical pulses to said electrical conducting element, means located along said waveguide means for generating an electrical signal in response to the reception of a sonic pulse launched by said magnet means when an electrical pulse is applied to said electrical conducting element, circuit means for providing an analogue signal that corresponds to the time interval between the application of an electrical pulse to said electrical conducting element and the reception of a sonic pulse by said signal generating means, and means responsive to said circuit means for indicating the position of said movable magnet means relative to said electrical signal generating means.

5. A linear distance measuring device comprising, a tubular sonic waveguide means, a wire element threaded axially through said waveguide means, said wire element being unattached to said waveguide means so that a sonic pulse transmitted by said waveguide means is unattenuated by said wire element, permanent magnet means movable along said waveguide means, pulse generating means for applying electrical pulses to said wire element to produce a pulsing magnetic field in said waveguide means, mode converter means connected to said waveguide means for generating an electrical signal in response to the reception of a sonic torsion pulse launched by said permanent magnet means when an electrical pulse is applied to said wire element, circuit means responsive to a pulse from said pulse generating means and a signal from said converter means for providing an analogue signal that corresponds to the time interval between the application of an electrical pulse to said wire element and the reception of a sonic pulse by said mode converter means, and means responsive to said circuit means for indicating the position of said movable magnet means relative to said mode converter means.

6. A linear distance measuring device comprising, sonic waveguide means formed of a magnetostrictive tubular member, a wire element threaded axially through said waveguide means, said wire element having an outside diameter less than the inside diameter of said waveguide means and being in unattached relationship with said waveguide means, pulse generating means for applying electrical pulses to said wire element to produce a pulsing circumferential magnetic field in said waveguide means, magnet means movable along said waveguide means for producing a longitudinal magnetic field in said waveguide means adjacent said magnet means, means located in a fixed position along said waveguide means for generating an electrical signal in response to the reception of a sonic pulse launched by the interaction of a circumferential magnetic field pulse and the longitudinal magnetic field produced by said magnet means, circuit means responsive to a pulse from said pulse generating means and to a signal from said signal generating means, and means responsive to said circuit means for indicating the position of said movable magnet means relative to said electrical signal generating means.

7. A measuring device according to claim 6 wherein said circuit responsive means includes a D.C. voltage reference source, voltage averaging means, means for connecting said reference source to said voltage averaging means when said pulse generating means applies a pulse to said wire element and for disconnecting said reference source when said signal generating means generates a signal in response to the reception of a sonic pulse, and means for biasing said voltage averaging means in accordance with the desired reference position of the movable magnet means.

8. A measuring device according to claim 7 wherein said circuit responsive means indicates a distance as a function of the voltage produced by said voltage averaging means.

9. A measuring device according to claim 6 wherein the sonic pulses are torsion pulses and wherein said electrical signal generating means is a mode converter comprising a pair of magnetostrictive tapes secured to opposite sides of said waveguide means, and a pair of coils associated with said tapes for generating an electrical signal when said tapes are pulsed by a sonic torsion pulse travelling along said waveguide means.

10. A measuring device according to claim 6 including shielding means for said sonic pulse responsive signal generating means.

11. A measuring device according to claim 6 wherein said circuit responsive means comprises means for producing an analogue signal indicative of the distance between said movable magnet means and said signal generating means.

* * * * *